Nov. 9, 1937.                J. R. MORGAN                2,098,509
                            HANDLEBAR GRIP
                          Filed May 23, 1936
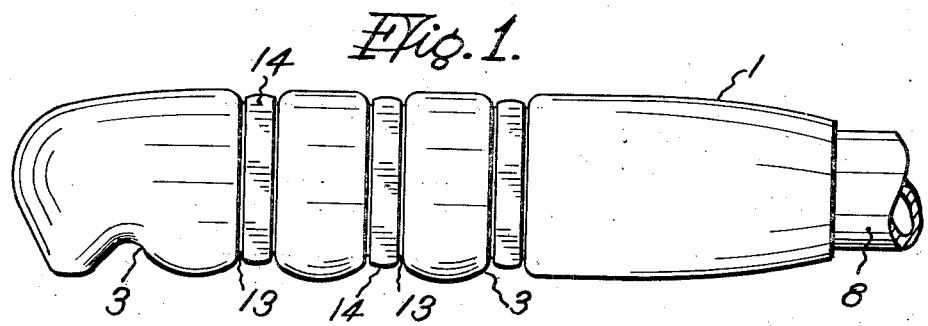
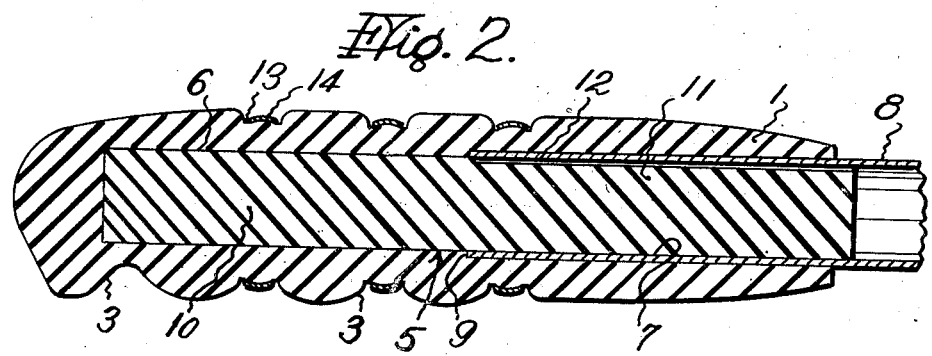
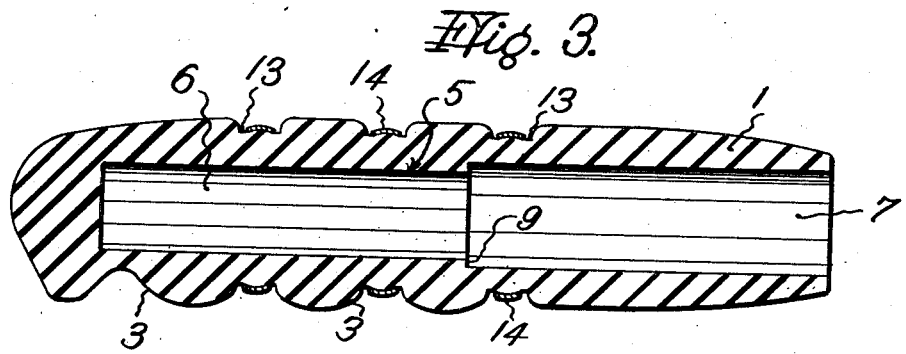
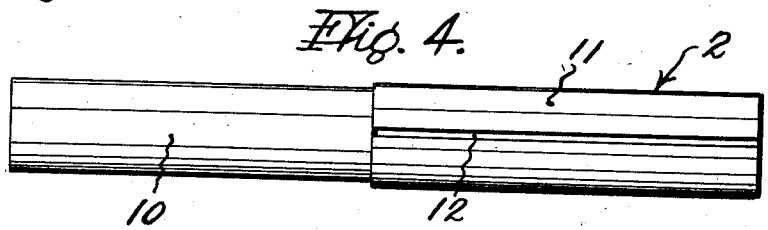
INVENTOR
BY JOHN R. MORGAN
Chapin & Neal
ATTORNEYS Patented Nov. 9, 1937

2,098,509

UNITED STATES PATENT OFFICE 2,098,509

HANDLEBAR GRIP

John R. Morgan, Oak Park, Ill., assignor to Sears, Roebuck and Co., Chicago, Ill., a corporation of New York Application May 23, 1936, Serial No. 81,391

2 Claims. (Cl. 208—126)

This invention relates to handlebar grips for bicycles and the like.

One object of the invention is to provide a handlebar grip which will substantially insulate the hands of the rider from the operating shocks and vibrations transmitted through the frame of the vehicle. Another object is to provide a structure which is economical to manufacture and assemble. Other and further objects will be apparent from the following specification and claims.

In the accompanying drawing, which illustrates one embodiment of the invention—

Fig. 1 is a side view of the grip assembled on the handlebar of a bicycle;

Fig. 2 is a vertical sectional view of the structure shown in Fig. 1;

Fig. 3 is a similar view of the barrel of the grip; and

Fig. 4 is a detail view of the core member of the grip.

Referring to the drawing, the grip is shown as composed of two main parts, namely, barrel 1 and core 2. The barrel may be given any desired outward form. As shown, the outer surface of the barrel is provided on its under side with depressions 3 to accommodate the fingers of the operator.

The barrel is formed of a slightly flexible resilient rubber compound and is molded with a bore 5 extending from one end to a point adjacent the other end. The inner portion 6 of the bore is given a smaller diameter than the outer portion 7, this difference in diameter being substantially equal to the wall thickness of the tubing of which the handlebar 8 is made, and is at least sufficient to form a shoulder 9 to limit and determine the extent to which the barrel is telescoped over the end portion of the handlebar. The diameter of the portion 7 is slightly less than the outside diameter of the handlebar so that the rubber material of the grip is stretched in placing it on the handlebar and the tension of the rubber holds the grip firmly to the handlebar.

The cylindrical core 2 is also formed of rubber compound and is molded separately from the barrel. The diameter of the portion 10 which engages in the portion 6 of the barrel is such that the parts make a tight forced fit by compression of the material of the core and compressive tensioning of the barrel. The diameter of the portion 11 is slightly greater than the inner diameter of the tubing of which the handlebar is made and is, therefore, compressed when inserted in the end of the handlebar, as shown in Fig. 2, to be tightly engaged therein. To facilitate insertion of the portion 11 into the metal tube 8, a venting channel, indicated at 12, is molded in the portion 11 of the core.

The barrel and core are cheaply manufactured as simple molding operations and the molds required are inexpensive. The barrel and core are easily assembled and applied as a unit to the handlebar. When applied, all surfaces of the grip which frictionally engage the metal surfaces of the handlebar are under tension or compression, assuring security of the assembly.

As is clear from Fig. 2, the grip becomes in effect a solid, resilient, slightly flexible extension of the handlebar. Since the major portion of the gripping surface is formed on this extending portion, the hand of the operator is insulated from substantially all shocks and vibrations, transmitted from the frame of the bicycle to the handlebar, by the resiliency and flexibility of the grip.

The flexibility of the grip may be, to a degree, varied or controlled by forming spaced circumferential grooves 13 in the outer surface of the grip and positioning annular metal bands 14 in the bottom of the grooves. By varying the depth and width of the grooves 13 or the width of the bands 14 or the degree of compression exerted by the bands on the rubber, the degree and character of the flexibility of the grip may be locally controlled apart from the inherent flexibility of rubber material.

What I claim is:

1. A handlebar grip for bicycles and the like which comprises a barrel member formed of a flexible rubber compound and having a bore extending from one end to a point adjacent the other end, a core member formed of flexible rubber compound, one end of said core making a compressed fit in the closed end portion of said bore, the portion of the bore adjacent the open end being enlarged to form with the core an annular recess in which the end of the handlebar may be inserted by a stress imposing distortion of the barrel and core, the portion of the core which engages in the handlebar being formed with a horizontal venting groove to facilitate its insertion in the handlebar.

2. A handlebar grip for bicycles and the like which comprises a barrel member formed of a flexible rubber compound and having a bore extending from one end to a point adjacent the other end, a core member formed of flexible rubber compound, one end of said core making a compressed fit in the closed end portion of said bore, the portion of the bore adjacent the open end being enlarged to form with the core an annular recess in which the end of the handlebar may be inserted by a stress imposing distortion of the barrel and core, the outer surface of the barrel being provided with one or more spaced circumferential grooves and bands of metal surrounding the barrel at the bottom of said grooves.

JOHN R. MORGAN.